March 1, 1960  G. A. LYON  2,926,955
COVER RETAINING WHEEL BALANCING WEIGHT CLIPS
Filed Oct. 4, 1955  2 Sheets-Sheet 1
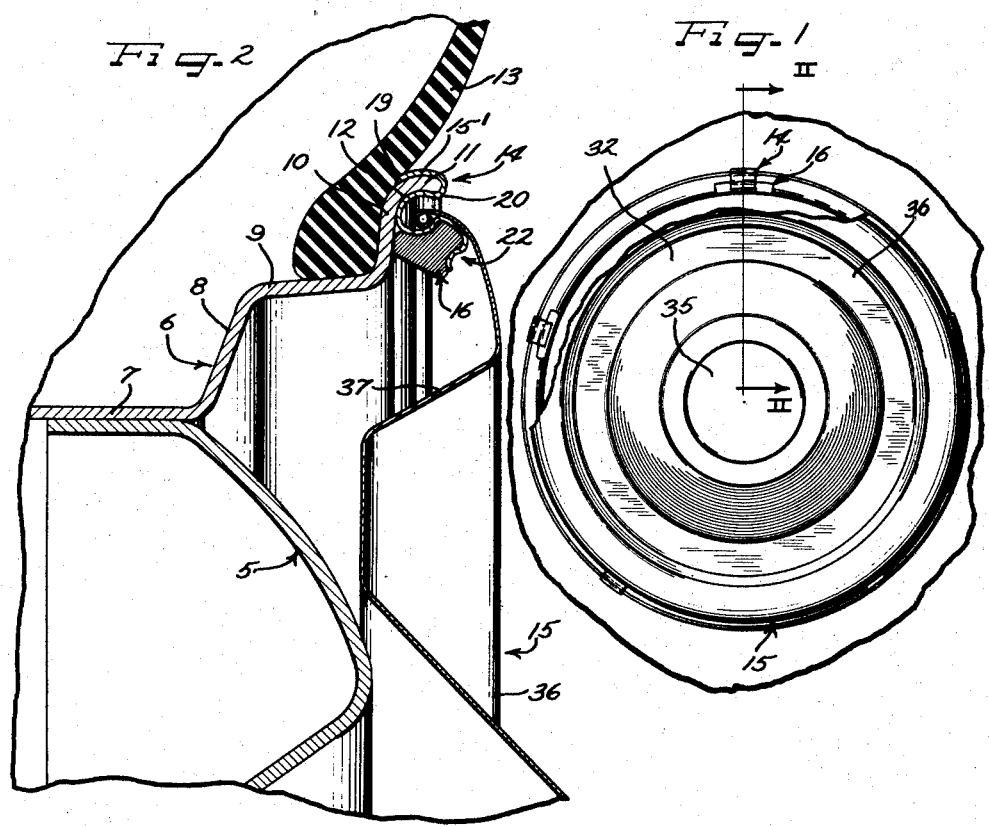
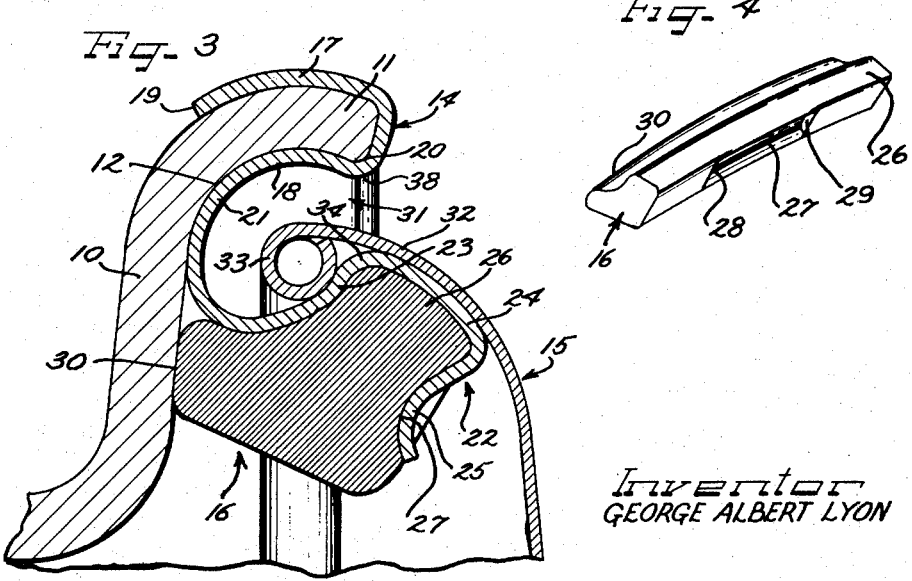
Inventor
GEORGE ALBERT LYON

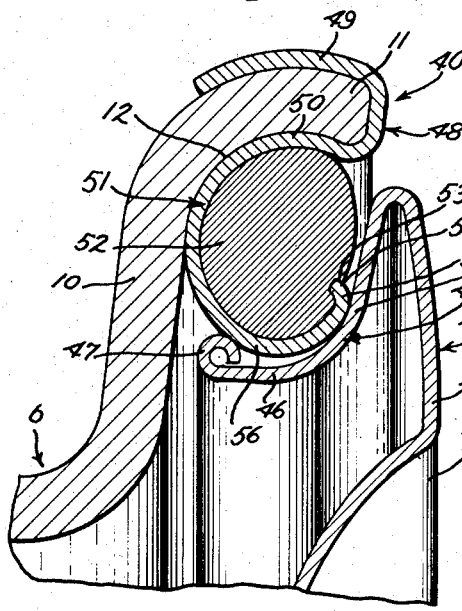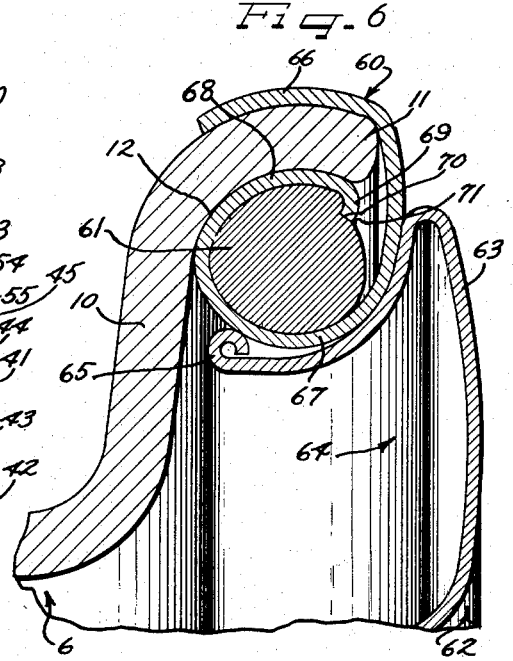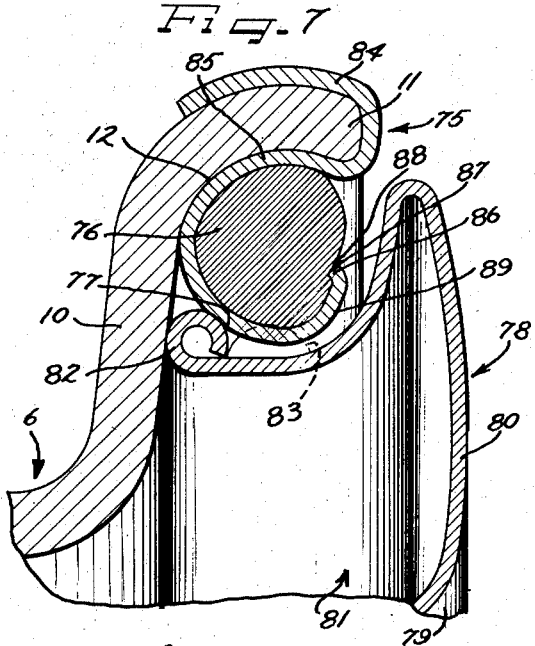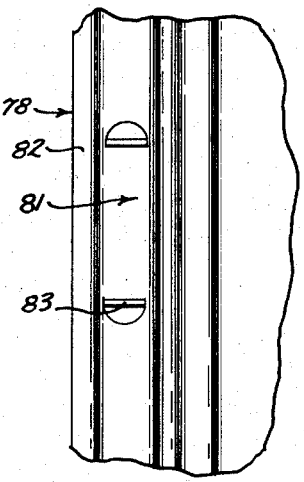

United States Patent Office 2,926,955
Patented Mar. 1, 1960

2,926,955
COVER RETAINING WHEEL BALANCING WEIGHT CLIPS

George Albert Lyon, Detroit, Mich.

Application October 4, 1955, Serial No. 538,309

10 Claims. (Cl. 301—5)

This invention relates generally to wheel structures and more particularly to the provision of novel retaining means for maintaining a wheel cover upon an automobile wheel.

In the past there has been developed various means for carrying wheel balancing weights upon the outer flange structure of a tire rim. The instant invention concerns itself with a new type novel clip construction which may be slipped over the slightly arcuate axial rim flange into gripping engagement therewith. The instant clip has an axial flanged rim gripping portion which is so constructed as to be capable of receiving a portion of the axial rim flange within the confines of the aforementioned rim gripping portion. Still further, this novel clip is provided with means for holding or maintaining wheel balancing weights upon the wheel while at the same time having a shoulder capable of cooperating with a cover retaining portion to maintain the cover upon the wheel.

Accordingly, it is an object of this invention to provide a new and improved clip construction for disposition on the terminal rim flange.

Still another object of this invention is to provide a novel clip which is capable of not only sustaining wheel balancing weights on the wheel but in addition, is capable of cooperating with a cover retaining portion to maintain a wheel cover member upon the wheel.

Still another object of this invention relates to a novel cover construction capable of cooperating with the aforementioned novel clip to maintain the cover upon a wheel and more particularly the retaining means thereon.

A further object of this invention relates to the provision of a novel clip which lends itself to large scale production on an economical basis.

According to the general features of this invention there is provided in a wheel structure including a rim having a radial flange joined to a terminal axial flange with the junction thereof defining an annular seat, a clip having a portion capable of gripping radially inner and outer surfaces of the axial flange thereby resisting axial displacement and having a second portion capable of being bottomed in the seat, a third shouldered portion capable of cooperating with a cover retaining element in maintaining the cover on the wheel, and a wheel cover having a resilient cover retaining portion capable of snap-on, pry-off engagement with the third shouldered portion.

Another feature of this invention relates to a cover having an under turned outer margin provided with struck out tabs capable of cooperating with a retaining clip in such a manner as to insure co-rotation upon the wheel.

Other objects and features of this invention will more fully appear from the following detailed description taken in connection with the accompanying drawings which illustrate several embodiments thereof and in which:

Figure 1 is a front elevation of a wheel structure having parts broken away illustrating my novel retaining clips and the manner in which the clips maintain the cover and wheel;

Figure 2 is an enlarged fragmentary cross sectional view taken substantially on the line II—II of Figure 1 looking in the direction indicated by the arrows;

Figure 3 is an enlarged detailed view of the clip and cover shown in Figure 2;

Figure 4 is a perspective view of a wheel balancing weight;

Figure 5 is an enlarged fragmentary detailed view of a modified form of my invention;

Figure 6 is an enlarged fragmentary view showing still another modified form of my invention;

Figure 7 is an enlarged detailed view showing a further modified form of my invention; and Figure 8 is an enlarged fragmentary detailed view of the cover shown in Fig. 7.

As shown in the drawings:

A vehicle wheel with which the present invention is adapted to be used may be more or less of the conventional type including a wheel body part 5 and tire rim part 6. The wheel body may be formed as a sheet metal pressed member including the usual dished bolt-on flange (not shown). This bolt-on flange may be secured in any suitable manner upon the axle of the wheel by bolts or the like. The tire rim 6 includes an attachment flange 7 which may be welded or otherwise secured to the body part 5, a generally radially outwardly extending rim flange 8, a generally axially outwardly extending rim flange 9, a generally radially outwardly extending rim flange 10 terminating in a generally axially outwardly extending terminal flange 11. It will be noted that at the junction of the rim flanges 10 and 11 there is provided an annular seat 12 which is important for purposes subsequently developed herein.

Carried upon the tire rim 6 is a customary vehicle wheel tire 13 which may be either of the tube or tubeless type and may be inflated by a valve stem (not shown).

Cooperable with the rim 6 are my novel retaining clips 14 which are particularly constructed so as to be capable of maintaining a cover 15 upon the wheel while at the same time sustaining wheel balancing weights 16. The clips 14 may be made of any suitable material although excellent results may be obtained through the use of spring steel.

My novel clips 14 include an axial rim terminal gripping portion 15' having two radial spaced arcuate resilient legs 17 and 18 which are especially adapted to grip the rim flange 11 in tensioned engagement. That is, as the legs are assembled on rim flange 11 they are slightly stressed radially apart in order to insure a good gripping action. Upon close examination of the rim construction it will be noted that the cross section of the terminal flange 11 is slightly arcuate. When the clip is mounted on the wheel, due to the arcuate engagement between the rim terminal gripping portion 15' and the rim flange, the portion must be slipped into tensioned engagement with flange 11 through the exertion of a slightly arcuate axially rearwardly application of force. It will be appreciated that the free end 19 of the clip and shoulder 20 each tend to resist direct axial outward removal thereof when in assembled relation. In other words, the clip must be removed in the same manner that it is assembled upon the rim flange and accordingly it is in this manner along with the terminal engagement that it resists direct axial displacement forces.

The clip 14 includes a second portion 21 of concave configuration corresponding generally to the configuration of rim 11. Joined to the radially inner end of portion 21 is a resilient balancing weight gripping portion indicated generally at 22. Portion 22 includes a generally radially and axially outwardly extending flange portion 23, a generally radially inwardly and axially outwardly extending portion 24, and a resilient radially and axially inwardly concave resilient gripping terminal 25.

The wheel balancing weight gripping portion 22 is especially adapted to receive a beaded portion 26 corresponding generally to the configuration defined by inner surfaces of portions 23, 24 and 25. In addition, the weight 16 has a recess 27 provided with spaced shoulders 28 and 29. When assembled with the clip 14 and more particularly clip portion 22, the terminal 25 snaps into the recess and bears against spaced shoulders 28 and 29 to insure co-rotation of the weight and clip.

Weight 16 additionally has a surface 30 which bears against radial rim flange 10 in assembly acting as a stop and back up shoulder for the gripping engagement between the clip 14, weight 16 and cover 15 now to be described.

Leg 18, second portion 21 and flange portion 23 define together a pocket or recess 31. The cover 15 has an outer margin 32 which is axially inwardly turned terminating in an annular curled pry-off cushioning bead 33 which in assembly is adapted to extend into recess 31 of each of the spaced clips 14. Flange portions 23 and 24 define together a retaining shoulder 34 with portion 24 being a lead-in camming surface upon which bead 33 may be flexed and snapped behind shoulder 34 and retained in engagement against portion 23. Cover 15 includes a central crown 35 with an annular dished portion 36 adjacent to margin 32. Connected to the margin 32 is an annular flange portion 37 providing a back-up for terminal 33 to enhance the gripping action.

In assembly of the components upon the wheel it will be appreciated that the wheel weights 16 are initially assembled in the manner previously described with clips 14. Thereafter, the clips 14 are circumferentially spaced about rim flange 12 in retained engagement therewith. Cover 15 is then centered with respect to the clips 14 and beaded terminal 33 is engaged against each of the lead-in portions 26 and thereafter upon the exertion of an axial force urged into retained engagement behind shoulders 34. Removal of the cover may be effected by inserting a suitable pry-off tool into the pocket 31 behind bead 33 and thereafter fulcruming the tool against shoulder 38 on clip 14 until the bead is stressed out of engagement with the shoulder 34.

In Figure 5 is shown a modified clip 40 for disposition on terminal rim flange 11. The clip 40 is adapted to cooperate with a modified cover construction 41. The cover 41 includes a back-up generally radially and axially outwardly extending annular flange 42 merging with cover margin 43. The cover margin 43 terminates in an underturned L-shaped annular terminal 44. The terminal 44 includes a generally radially inwardly extending portion 45 connected to a generally axially inwardly extending portion 46 terminating in an annular beaded cushioning gripping terminal 47.

The clips 40 each include an axial rim terminal gripping portion 48 having two radially spaced arcuate resilient legs 49 and 50. These legs function in much the same manner as in the first form of my invention in that they are guided over the rim flange 11 and are slightly divergently deflected to effect tensioned engagement. Furthermore, the legs are of a slightly arcuate configuration in order to serve the same purpose set out in connection with the leg 17 and 18 in the first form of my invention.

Leg 50 is connected to a resilient balancing weight gripping portion indicated generally at 51. In this instance, weight 52 is more or less of an oval construction having a recess 53 provided with spaced shoulders 54 for receiving therein the terminal 55 of clip 40. Thus, in assembling the weight 52 with the clip 40 and more particularly the clip gripping portion 51, the terminal of the clip 55 is stressed slightly in order to allow the weight 52 to be slid into the cavity defined by the clip gripping portion 51 until terminal 55 snaps into recess 53. Shoulders 54—54 have been provided in order to insure against the weight from being disengaged from the clip.

When the clip 40 is assembled on the wheel it will be appreciated that the weight engaging portion 51 is bottomed in rim seat 12. Additionally, weight gripping portion 51 includes an arcuate intermediate portion 56 which merges with terminal 55. This arcuate portion 56 provides a shoulder behind which the bead 47 is adapted to be retainingly engaged after being resiliently stressed radially inwardly from the clip terminal 55.

The clip 40 may be assembled on the wheel in much the same manner as in the first form of my invention and of course the weight 52 may be assembled with the clip either before or after the clip has been mounted on the wheel. After the clip has been assembled on the wheel, cover 41 is centered with respect thereto with beaded portion 47 engaged against terminal 55. Upon the application of an axially inward force the bead 47 is progressively flexed along arcuate portion 56 until it snaps into cover retaining engagement behind the shoulder provided by the arcuate portion 56. Removal may be effected by inserting a suitable pry-off tool under the margin 43 and levering the beads 47 out of engagement with the clips.

Figure 6 shows another modified form of my invention having a novel clip 60 adapted to interlockingly receive a balancing weight 61 and to cooperate with a cover 62 which is of much the same construction as the cover 41 shown in Figure 5. The cover 62 includes a margin 63 having an underturned L-shaped annular flange structure 64 terminating in a curled annular cushioning bead 65.

In this instance the clip 60 has a configuration more or less corresponding to the numeral 6 as opposed to the other three forms of my invention wherein the clips have a configuration corresponding generally to the numeral 5. The clip 60 has an outer arcuate leg 66 connected to a looped portion 67 having an arcuate intermediate portion 68 adapted to engage the underside of the terminal rim flange 11, and terminating in an inwardly turned terminal 69. In this case the weight 61 is more or less elliptical in configuration and has a recess 70 provided with spaced abutments or shoulders 71 so as to be capable of interlocked engagement with the clip terminal 69 much in the same fashion as previously set out in connection with the other forms of the invention.

The weight 61 and clip 60 may be assembled together by applying an outward force upon intermediate resilient spring portion 66 and thereafter guiding the weight 61 into the channel defined by the looped portion 68 until the clip terminal is interlocked in recess 70.

The clip and weight assembly may then be assembled upon the rim 6 at circumferentially spaced intervals. This may be accomplished by stressing the leg 66 divergently outwardly until there is sufficient room for the rim flange 11 to be inserted between leg 66 and intermediate portion 68 and upon release of leg 66 tensioned engagement is obtained. It should be noted that leg 66 and portion 68 are each of an arcuate configuration as to be capable of nested engagement with the rim. This arcuate configuration also serves to resist axial displacement of the clip as set out in connection with the other modifications herein.

In the modification shown in Figures 7 and 8 there is illustrated a clip 75 capable of retainingly carrying a wheel balancing weight 76, and additionally, providing a shoulder 77 behind which cover 78 may be retainingly maintained.

Cover 78 includes an annular back-up flange portion 79, a margin 80, and an underturned generally L-shaped annular resilient cover retaining portion 81. The portion 81 terminates in a curled cushioning bead 82 which in assembly is adapted to be retainingly tensioned behind clip shoulder 77 in assembly therewith while at the same time being bottomed against rim flange 10 in order to minimize axial deflection of the cover.

Provided on the L-shaped flange portion 81 in circumferentially spaced relation are sets of struck out tabs 83 which serve as stops to insure co-rotation of the cover when the cover is mounted upon the wheel, that is, the stops 83 each engaging on opposite sides of clip 75.

Clip 75 includes an arcuate leg 84 connected to a looped intermediate portion 85 which is adapted to nest in seat 12 in assembly. The looped portion 85 terminates in an inturned terminal 86.

The clip is adapted to be assembled with the weight in much the same manner as previously set out and more particularly, the terminal 86 extends into recess 87 having opposed stops or shoulders 88 to resist displacement of the weight in assembly.

Assembly of the weight 76 and clip 75 may be effected either before or after the clip 75 is mounted on the wheel. The clip 75 may be mounted on the wheel by slightly deflecting leg 84 and thereafter slipping the leg 84 and arcuate portion 85 over rim flange 11 until the arcuate portion 85 is bottomed in seat 12. Assembly of the weight and clip may be effected by stressing the resilient terminal 86 and thereafter sliding the weight 76 into the channel defined by the arcuate portion 85 until the terminal 86 snaps into the recess 87 behind and between shoulders 88.

The cover is then centered with respect to the wheel and more particularly the stops 83 are centered with respect to the clips 75 with the annular bead 82 engaged against the outer lead in surface 89 and thereafter upon the application of an axially inward force the bead is resiliently stressed and subsequently snapped behind shoulder 77 until the bead 82 is bottomed against the rim 10.

Removal of the cover may be effected by inserting a suitable pry-off tool underneath the outer margin 80 of the cover and thereafter levering a force sufficient to disengage bead 82 from shoulder 77.

It will be appreciated in the modified form of Figures 7 and 8 that the tensioned engagement is effected by reason of the resilient stressing of leg 84. By reason of the arcuate configuration of the leg 84 and the looped portion 85, a resistance is set up such that the clips 75 are not easily disengageable through the application of axial forces. Rather the clips must be guided off in a more or less arcuate plane to effect disengagement.

In all forms of the invention the tensioned engagement effected between the clips and cover serve to augment the retaining action between the clip and rim flange 11.

It will be understood that modifications and variations may be effected without departing from the scope of the novel concepts of the present invention.

I claim as my invention:

1. In a wheel structure including a tire supporting multi-flanged rim having a generally axial terminal rim flange, circumferentially spaced cover retaining clips each having a terminal rim flange gripping portion for holding the clip in assembly with the tire rim, said clips having a wheel balancing weight retaining portion, a wheel balancing weight supported in assembly by said weight retaining portion, said clips having shoulders, and a wheel cover member including a rearwardly extending portion in resilient detachable engagement behind said shoulders to maintain the cover in assembly with the wheel.

2. The wheel structure of claim 1 further characterized by interlocking means between said wheel balancing weight and said weight retaining portion.

3. In a wheel structure including a tire supporting multi-flanged rim having a generally axial terminal rim flange, circumferentially spaced cover retaining clips each having a terminal rim flange gripping portion for holding the clip in assembly with the tire rim, said clips having a wheel balancing weight retaining portion including a resilient leg, a wheel balancing weight supported in assembly by said weight retaining portion and held under resilient tension in assembly by said leg, said clips having shoulders, and a wheel cover member having a rearwardly extending portion in resilient detachable engagement behind said shoulders to maintain the cover in assembly with the wheel, said weight being in bottomed engagement with the wheel to resist being disassembled from said portion and to provide a rigid back-up for said shoulder.

4. In a wheel structure including a tire supporting multi-flanged tire rim having a generally axial terminal rim flange, circumferentially spaced cover retaining clips each having a S-shaped portion defining radially inner and outer looped portions, said outer looped portion grasping said terminal rim flange to maintain the clip in assembly therewith, a wheel balancing weight carried in removable assembly with said clip, said clips having a cover retaining shoulder, and a wheel cover section having a portion in resilient detachable cover retaining engagement behind said shoulders.

5. In a wheel structure including a tire supporting multi-flanged tire rim having a generally axial terminal rim flange, circumferentially spaced cover retaining clips each having a S-shaped portion defining radially inner and outer looped portions and with the radially inner leg of said inner looped portion having a cover retaining shoulder, said outer looped portion grasping said terminal rim flange to maintain the clip in assembly therewith, a wheel balancing weight carried in removable assembly in said inner looped portion, and a wheel cover section having a portion in resilient detachable cover retaining engagement behind said shoulders.

6. In a wheel structure including a tire supporting multi-flanged tire rim having a generally axial terminal rim flange, circumferentially spaced cover retaining clips each having a S-shaped portion defining radially inner and outer looped portions and including a wheel balancing weight retaining portion connected to said inner portion, said outer looped portion grasping said terminal rim flange to maintain the clip in assembly therewith, a wheel balancing weight carried in removable assembly with said weight retaining portion, said clips having a cover retaining shoulder at the junction of said inner looped portion and said weight retaining portion, and a wheel cover section having a portion in resilient detachable cover retaining engagement behind said shoulder and extending into the opening defined by said inner looped portion.

7. In a wheel structure including a tire supporting multi-flanged rim having a generally axial terminal rim flange, circumferentially spaced cover retaining clips each having a terminal rim flange gripping portion for holding the clip in assembly with the tire rim, said clips having a wheel balancing weight retaining portion, a wheel balancing weight supported in assembly by said weight retaining portion, said clips having shoulders, and a wheel cover member including resiliently deflectable cover retaining structure in resilient detachable engagement behind said shoulders to maintain the cover in assembly with the wheel, said shoulders being annularly arranged and disposed on the radially innermost side of the clips and with said resiliently deflectable cover retaining structure arranged in a circle having a diameter slightly at variance with the diameter of the annularly arranged shoulders to sustain the cover in assembly with the clips.

8. In a wheel structure including a tire supporting multi-flanged rim having a generally axial terminal rim flange, circumferentially spaced cover retaining clips each having a terminal rim flange gripping portion for holding the clip in assembly with the tire rim, said clips having a wheel balancing weight retaining portion, a wheel balancing weight supported in assembly by said weight retaining portion, said clips having shoulders, and a wheel cover member including cover retaining structure in resilient detachable engagement behind said shoulders to maintain the cover in assembly with the wheel, said clip having a looped portion between said terminal rim flange portion and said wheel balancing weight retaining portion which looped portion bears said shoulder and with a portion of said cover retaining structure extendible into said looped portion and resiliently engaged behind said shoulder.

9. In a wheel structure including a rim having a radial rim flange joined to a terminal rim flange with the junction thereof defining an annular seat, circumferentially spaced clips for assembly on the rim generally at the area of the seat with each of said clips having means for sustaining itself upon the terminal rim flange comprising a terminal rim flange gripping portion, said clips having wheel balancing weight gripping means for sustaining a wheel balancing weight in assembly on the wheel, wheel balancing weights carried in assembly with said clips by said wheel balancing weight gripping means, and a wheel cover structure retainingly cooperable with said clips in detachable assembly therewith.

10. In a wheel structure including a rim having a radial rim flange joined to a terminal rim flange with the junction thereof defining an annular seat, circumferentially spaced clips for assembly on the rim generally at the area of the seat with each of said clips having means for sustaining itself upon the terminal rim flange comprising a terminal rim flange gripping portion, said clips having wheel balancing weight gripping means for sustaining a wheel balancing weight in assembly on the wheel, wheel balancing weights carried in assembly with said clips by said wheel balancing weight gripping means, and a wheel cover structure retainingly cooperable with said clips in detachable assembly therewith, said clips each having a clip surface area engageable by said cover structure and with said clip surface area being disposed radially between said means for sustaining the clip on the wheel and said wheel balancing weight gripping means.

References Cited in the file of this patent

UNITED STATES PATENTS

| | | |
|---|---|---|
| 2,065,633 | Van Halteren | Dec. 29, 1936 |
| 2,122,064 | Hume | June 28, 1938 |
| 2,137,416 | Rubsam | Nov. 22, 1938 |
| 2,351,655 | Aske | June 20, 1944 |